Patented Feb. 21, 1933

1,898,540

UNITED STATES PATENT OFFICE

JAMES EDWIN HUTCHMAN, OF NEWBURGH, NEW YORK, ASSIGNOR TO L. E. CARPENTER & CO., INC., OF NEWARK, NEW JERSEY, A CORPORATION OF NEW JERSEY

COATING COMPOSITION

No Drawing. Application filed May 13, 1931. Serial No. 537,207.

This invention relates, generally, to coating compositions or materials; and the invention has reference, more particularly, to a novel coating composition especially suitable for use in book binding and the like, the said material being particularly adapted to serve as a finishing coat or coats for artificial or genuine leather used in book binding.

Heretofore, in using artificial leather or the like in book binding it has been necessary to coat the finished artificial leather or the like with a suitable size or sizing. This size when applied in book binding to book covers, enables end sheets to be adhered to the book covers by the use of ordinary book binders' paste and also enables stamping to be firmly adhered to and retained upon the cover. It has been necessary heretofore to use a size on artificial leather or the like because book binders' paste will not adhere to the pyroxylin finish of the artificial leather used in the trade, but the paste will adhere to the size after the latter has been applied to the pyroxylin finish of the leather.

The principal object of the present invention lies in the provision of a novel coating composition and a method of producing the same which is adapted to be applied as a finishing coat or coats to artificial leather or the like during the manufacture thereof, which coating composition not only serves as the final coat or coating of the artificial leather but also serves as a size to which ordinary book binders' paste will firmly adhere, thereby eliminating the common necessity of applying a size before pasting in the end sheets.

Another object of the present invention is to provide a novel coating composition and method of producing the same, which method consists essentially in intermixing a drying oil, preferably boiled linseed oil, with a pyroxylin solution, the said composition being adapted to be readily and easily applied in coatings of any thickness, which coatings when dried, form a tough, resistant finish for the body to which it is applied.

Still another object of the invention lies in the provision of a novel coating composition of the above character which is of stable character and will stand ordinary wear and abrasion without injury, the said composition being adapted to be readily and cheaply produced in practice.

Other objects of this invention, not at this time more particularly enumerated will be clearly understood from the following detailed description of the same.

In carrying out the novel method of the present invention, a pyroxylin solution is prepared by dissolving dry nitrocellulose in a suitable solvent mixture such as a mixture consisting of ethyl acetate, butyl acetate, alcohol, and toluol. A desired drying oil which may be a blown, bodied, or synthetic drying oil or resin, but preferably boiled linseed oil is used and is dissolved in a suitable lacquer solvent such as in one or more of the solvents mentioned above used for dissolving pyroxylin. The pyroxylin solvent mixture is then intermixed with the linseed oil solvent mixture. Small percentages of a suitable dryer or dryers may also be used in preparing the composition, in which case these dryers are preferably intermixed with the linseed oil before the same is boiled.

As an example of a composition employing boiled linseed oil and embodying the principles of the present invention, the ingredients are mixed together in the following proportions by weight:

Dry pyroxylin_____ 1 part
Boiled linseed oil_____ 1 part
Solvent mixture_____ 10 parts
Dryer_____ .002 parts (approx.)

A relatively small quantity of a suitable plasticizer or plasticizers such as dibutyl phthalate, toluene sulphamide or substituted products and castor oil, may be added when extreme flexibility of the coating or film is desired. The use of these plasticizers is ordinarily unnecessary and their use should be limited to small quantities or else the adhesiveness of the resulting film may be impaired. The use of these plasticizers, however, will ordinarily facilitate the stamping operations.

The preferred manner of preparing this form of the composition is as follows:

Fifteen gms. of dry pyroxylin are dissolved in eighty-five gms. of a suitable solvent mixture consisting, for example, of alcohol, ethyl acetate, butyl acetate and toluol. A commercial solvent mixture preparation known in the trade as "Publicker #553" comprising ethyl acetate, denatured alcohol and solvent naphtha may be used as the solvent mixture. Fifteen gms. of boiled linseed oil is then dissolved in sixty-five gms. of a solvent mixture comprising, for example, alcohol, ethyl acetate, butyl acetate, and toluol. The pyroxylin solvent mixture is then thoroughly intermixed with the linseed oil solvent mixture, thereby forming the novel composition of the present invention.

The small percentage of dryer included in the above formula may consist of manganese, cobalt, or lead linoleate or any other suitable dryer. A small quantity of this dryer in the order of .002 of a gram or more, depending upon the desired rapidity of drying of the final composition, is preferably added to the linseed oil before the same is boiled and is boiled along with the linseed oil. The plasticizers when used are added to the combined linseed oil-pyroxylin solutions.

The coating composition thus produced may be applied to any surface and forms a hard, tough and protective finish. It is especially adapted to be applied to any artificial or real leather, either before or after the leather is embossed and may be applied with or without pigment or other coloring matter. When pigment is used the same is properly ground in a suitable plasticizer or in boiled linseed oil or in a solvent and is added to the desired extent to the composition before applying the same. When used with artificial leather, this coating composition is usually employed as the finishing coat or coats and is ordinarily applied to the artificial leather during the manufacture thereof. When thus applied to the artificial leather or other surface, the novel composition of this invention not only provides a desirable finish, but serves as a size to which ordinary book binders' paste will adhere firmly, thereby eliminating the common necessity of applying a size to the artificial leather cover or other surface before pasting in the end sheets.

The novel composition of the present invention may be applied in a single coat or in as many coats as desired, and each successive coat will adhere firmly and permanently to the underlying coat. Instead of using boiled linseed oil in the above formula, other drying oils such as blown, bodied and synthetic drying oils or resins may be used, such as tung oils, amberol, bakelite varnishes and bakelite resins may be used.

In some instances it was found desirable to add crude gluten such as that obtained by extraction from corn or other grain to the above ingredients. This crude gluten was added by dissolving as much of the same as could be dissolved in the pyroxylin and oil solvent mixtures. It was found that these solvent mixtures would dissolve approximately 1% of their weight of the crude gluten. When crude gluten is incorporated in the composition, it is found that a quicker drying composition is formed and the application of gold or ink stamping as in book binding is facilitated. In some instances the crude gluten, in the form of a saturated solvent solution, may be applied as a coat over the novel composition of this invention.

While there is given above an illustrated table of relative proportions of the several ingredients of the composition, it is to be understood that variations may be made within reasonable limits. For example, if the quantity of boiled oil ingredient is maintained constant at fifteen grams, it was found that the pyroxylin ingredient may be varied from substantially zero grams to forty-five grams and that the solvent mixture may be varied from fifty grams to four thousand one hundred and eighty-five grams, while still obtaining compositions having the essential qualities of applicant's preferred composition.

Although throughout the specification pyroxylin has been mentioned as one of the essential ingredients, it is to be understood that other similar cellulose compounds or esters, such as cellulose acetate may be used and are also included in the term pyroxylin in the following claims.

What is claimed is:—

1. A coating composition for the purposes described comprising substantially equal parts of boiled linseed oil, and pyroxylin, a solvent mixture and gluten.

2. A coating composition for the purposes described comprising, a mixture of the herein named ingredients in the approximate proportions by weight, as follows:

| | |
|---|---|
| Dry pyroxylin | 1 part |
| Boiled linseed oil | 1 part |
| Solvent mixture | 10 parts |
| Dryer | .002 parts (approx.) |
| Crude gluten | .1 part |

In testimony that I claim the invention set forth above I have hereunto set my hand this 30th day of April, 1931.

J. EDWIN HUTCHMAN.